Figure 16:
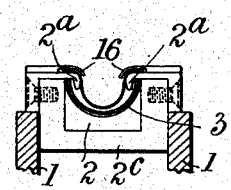
Figure 17:
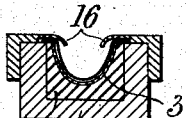
Figure 18:
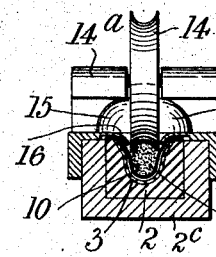
Figure 19:
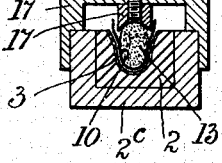
Figure 20:
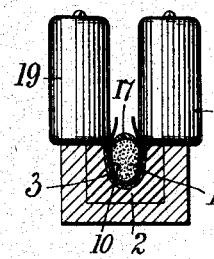

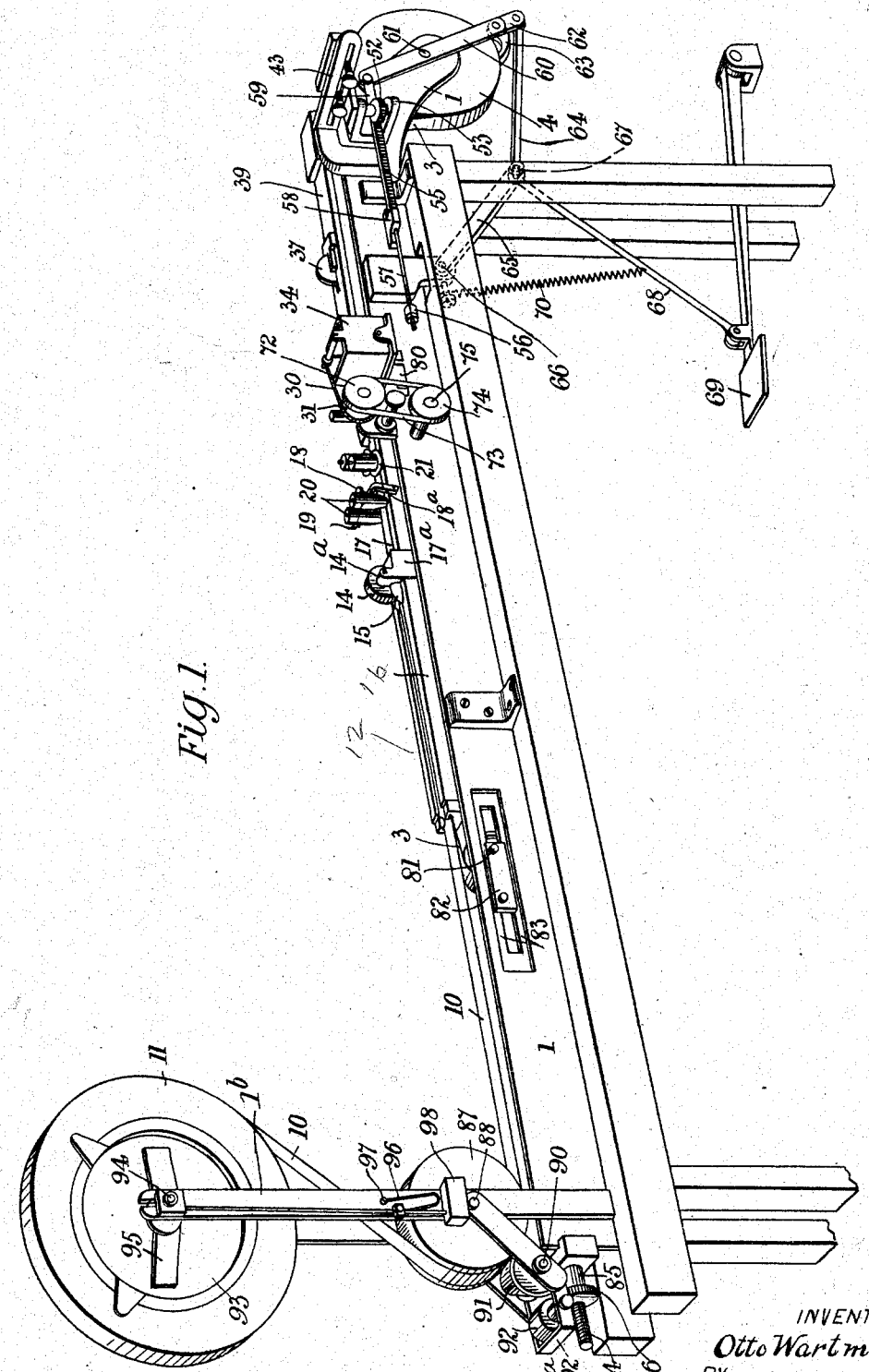

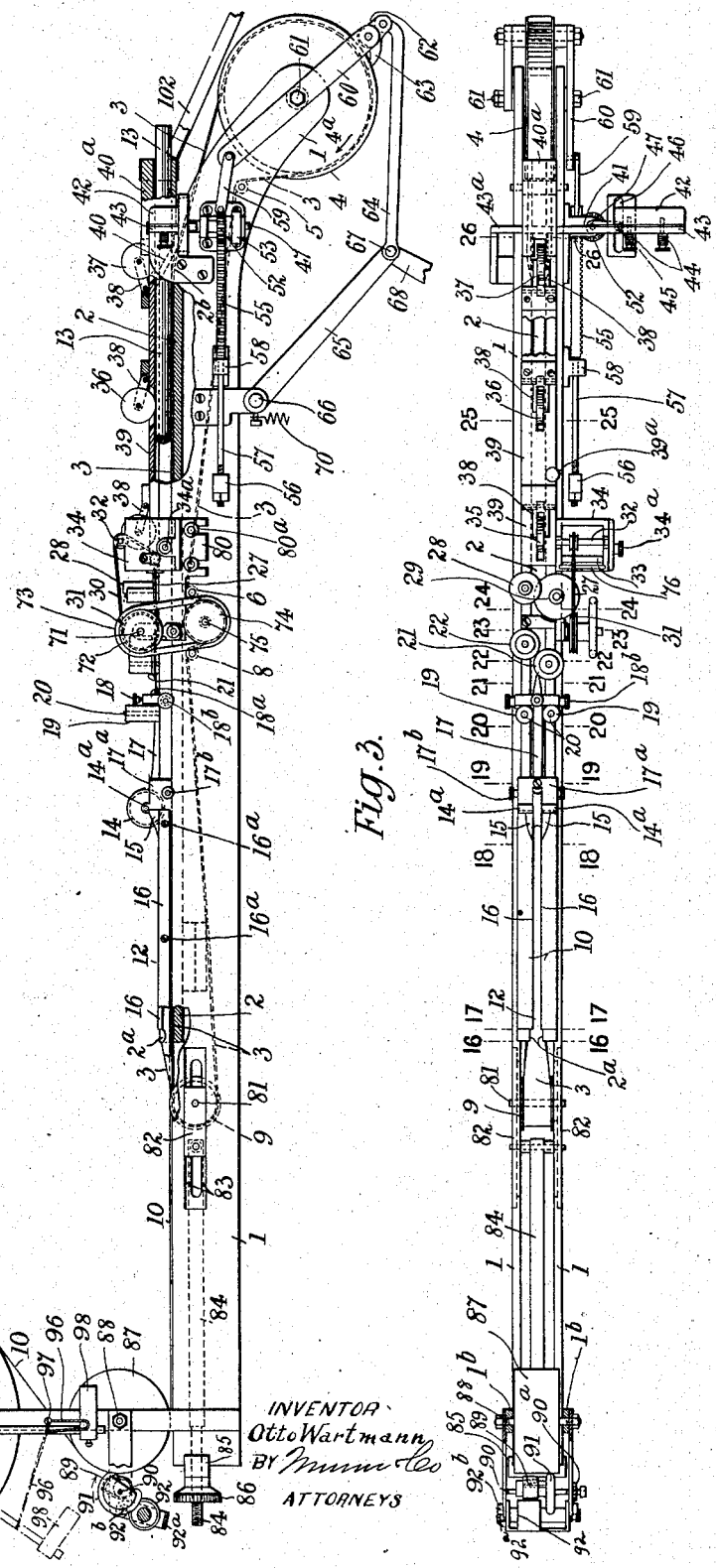

O. WARTMANN.
APPARATUS FOR MANUFACTURING CIGARETTES.
APPLICATION FILED OCT. 31, 1907.
927,196.
Patented July 6, 1909.
4 SHEETS—SHEET 3.
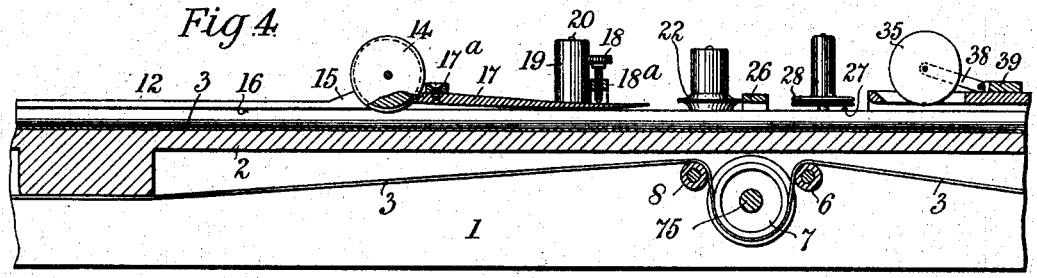
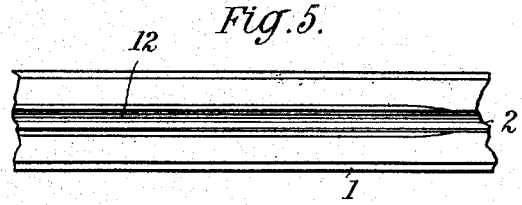
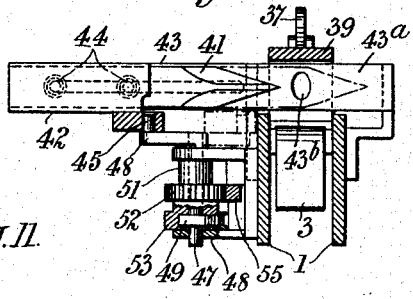
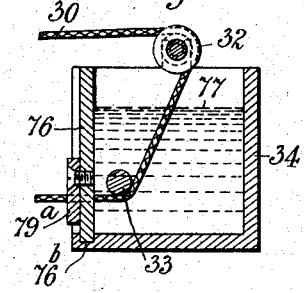
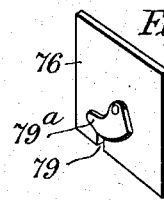
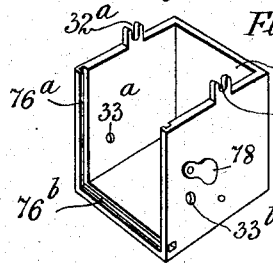
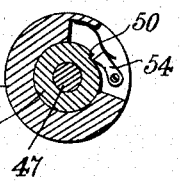
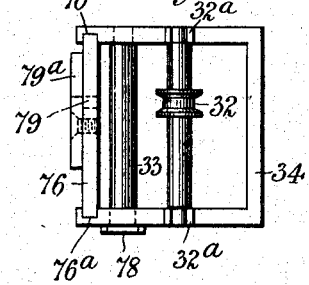
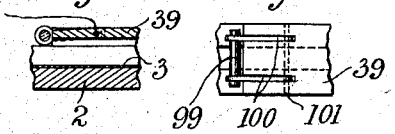
WITNESSES
F. A. Hooter
J. P. Davis
INVENTOR
Otto Wartmann
BY
Munn & Co
ATTORNEYS O. WARTMANN.
APPARATUS FOR MANUFACTURING CIGARETTES.
APPLICATION FILED OCT. 31, 1907.

927,196.

Patented July 6, 1909.
4 SHEETS—SHEET 4.

WITNESSES
F. A. Hooter
J. P. Davis

INVENTOR
Otto Wartmann
BY Munn & Co
ATTORNEYS

UNITED STATES PATENT OFFICE.

OTTO WARTMANN, OF TOTTENHAM, LONDON, ENGLAND.

APPARATUS FOR MANUFACTURING CIGARETTES.

No. 927,196.          Specification of Letters Patent.          Patented July 6, 1909.

Application filed October 31, 1907. Serial No. 400,009.

*To all whom it may concern:*

Be it known that I, OTTO WARTMANN, a subject of the King of Great Britain, and resident of 681 High road, Tottenham, London, N., England, cigar manufacturer, have invented an Improved Apparatus for Manufacturing Cigarettes, of which the following is a specification.

This invention relates to an improved method of and apparatus for manufacturing cigarettes, a chief object of the invention being to enable the production of cigarettes which, while formed to a large extent by means of automatically acting mechanism, shall be free from the defects of ordinary machine-made cigarettes and shall exhibit some of the best characteristics of those made entirely by hand.

According to the present invention the tobacco is fed by hand directly on to a continuous strip of paper and, when the paper has been lapped and secured around the tobacco, the lengths constituting the individual cigarettes are severed from the "stock" by automatic mechanical action; the feeding of the tobacco by hand and the subsequent lapping of the paper around it both permitting the filling to be performed without the length of the tobacco becoming impaired, and also obviating the production of a hard and inelastic core of tobacco which would tend to fit loosely within a separately formed paper tube as in ordinary machine-made cigarettes.

A leading feature of the invention is the method employed to sever the individual cigarettes, this operation being performed by means of a knife having a flat V-pointed blade adapted to first pierce the "stock" (comprising the core of tobacco and the paper envelop therefor) in the center of its width and to thereafter cut outward in both directions simultaneously. In order to permit of the cutting operation being performed by a knife which is stationary with reference to the length of the stock, the latter is not fed forward continuously as in the ordinary cigarette-making machines, but receives intermittently a longitudinal movement of advance to an extent equal to the length of the individual cigarettes to be produced, and the knife is made to perform its cutting and return strokes during the intervals of rest between successive forward movements of the stock. These periods of rest are utilized for the operation of feeding successive portions of tobacco on to the paper by hand as already described.

The machine of the present invention, while capable of being driven by any form of mechanical power, is more particularly designed for the use of small manufacturers employing manual labor alone, for which purpose it is specially adapted for actuation by means of a treadle, and will be so described. Moreover, the machine is of such simple construction that its cleansing and maintenance, and even if necessary its repair, should be within the power of any person of ordinary intelligence.

By the employment of treadle mechanism for actuating the machine, the requisite intermittent forward movements (alternating with intervals of rest) may be very readily communicated to the stock. In cases where the machine is actuated by continuously running power, it is necessary to interpose reciprocating mechanism in the train of gearing whereby the stock is propelled, so as to produce a like effect. At each depression of the treadle (or forward stroke of the equivalent reciprocating part) the operations incidental to all stages in the production of a finished cigarette are performed upon successive portions of a continually renewed length of stock which at the same time is fed forward a distance corresponding to the predetermined and adjustable length of the cigarettes to be produced, while at each return stroke of the treadle (or equivalent reciprocating part) the length of stock thus fed forward is severed, all these operations, with the exception of the filling of the tobacco into the paper, being automatically consequent upon the actuation of the machine intermittently through the medium of a reciprocating part primarily actuated by foot or otherwise, so that the person feeding the tobacco to the machine can equally well furnish or control the supply of power.

In the accompanying drawings, which illustrate the machine of the present invention in its preferred form, Figure 1 is a perspective view of the improvement. Fig. 2 is a side view. Fig. 3 is a plan view. Fig. 4 is a vertical longitudinal section. Fig. 5 is a plan view of a portion of a trough. Fig. 6 is a detail plan view partly in section of the cutting mechanism. Fig. 7 is a section of the knife operating shaft. Fig. 8 is a section through the glue receptacle. Fig. 9 is a plan view thereof. Fig. 10 is a perspective view of the receptacle. Fig. 11 is a similar view of the removable side. Fig. 12 is a similar view of the upper roller. Fig. 13 is a similar view of the lower roller. Fig. 14 is a transverse section of the trough on the line of the compressor. Fig. 15 is a plan view of Fig. 14, and Figs. 16 to 26 inclusive are sections of the trough showing the different steps of the operation of forming the cigarette.

Similar reference numerals denote corresponding parts throughout the drawings.

The machine in its preferred form comprises a horizontal trough 2 having a cross-sectional configuration corresponding to three sides of the cigarette stock passing through it, this trough being removably mounted between a pair of longitudinal cheek-plates 1, 1 which serve to carry the entire mechanism (with the exception of the treadle when such is used) and which are adapted to be fixed to a bench or table such as 1ª Fig. 1. Through the trough 2 passes an endless band 3 of fabric which is fed forward step by step, the band assuming the cross-sectional configuration of the trough beneath which it returns over guide pulleys 4, 5, 6, 7, 8 and 9. The forward movement of the band 3 through the trough is employed to communicate a corresponding movement (and, in general, a corresponding cross-sectional configuration) to the strip of paper 10 which is drawn (by frictional contact with the band) from a roll 11 suitably mounted at the rear end of the machine, while the return movement of the band beneath the trough may be utilized to actuate various portions of the mechanism. Means are provided for maintaining the band 3 and paper 10 in proper position transversely of the trough 2 and relatively to one another during their travel through the trough.

It is to be understood that prior to the commencement of operations, the first portion of the paper strip unwound from the roll must be led by hand through the machine for a sufficient distance to insure its receiving the proper cross-sectional contour, this portion of paper being left in the machine so that the remainder of the paper will be caused to follow it throughout all its convolutions as it is subsequently drawn forward by frictional contact with the endless band.

At the rear or feed end of the machine, the trough is open as at 12 (Figs. 3ª, 3ᵇ) for a length sufficient to permit of the tobacco (placed ready upon a board or table—not shown—adjacent to this part of the trough) being laid or packed in position upon the paper by hand with the required degree of pressure and without breaking the fiber. At the entrance to the trough (whose bottom is above the level of the pulley 9 over which the endless band 3 returns from beneath the trough) the edges of the band are drawn apart by a pair of short guides 2ª (Figs. 2ª, 3ª and 16) beneath which the edges of the band pass, the edges of the paper strip meanwhile passing above these guides 2ª and immediately thereafter passing beneath a pair of guides 16 which are described more fully later on.

The forward movement of the tobacco deposited upon the paper strip at the open portion 12 of the trough, carries the tobacco under a roller 14 (mounted to turn in bearings 14ª on the sides of the trough) whereby the upper surface of the tobacco is lightly but firmly pressed to approximately the desired shape, while a pair of frames or strikers 15 (Figs. 3ᵇ and 18) mounted in rear of this roller serve to sweep off (but without injuring) any surplus tobacco before the latter encounters the roller. Until the paper has passed the roller 14, its edges are held retracted by and beneath the guides 16 (constituting inwardly turned lips for the trough) whereby injury to the delicate margins of the paper during the tobacco filling operations is prevented, these guides (whose cross-sectional shape is shown clearly in Figs. 16, 17 and 18) also serving to prevent lateral displacement of both the paper 10 and the endless band 3.

On passing the roller 14, the core 13 of tobacco enters a somewhat narrower portion of the trough wherein it is carried along beneath a presser plate 17 (Figs. 3ᵇ, 4 and 20) in the form of a longitudinally extending tongue attached at its rear end to a bridge-piece 17ª spanning the trough. The tongue 17 is transversely concave on its under side, whereby the upper surface of the core is brought to its finished cross sectional form and is at the same time slightly compressed so as to be adapted, when the paper has been closed about it, to expand and fill the paper completely under the influence of the natural elasticity of the tobacco itself. This tongue may be of spring metal, and may be provided with any convenient means (such as a set-screw 18 passing through a threaded hole in a bridge-piece 18ª near the point of the tongue) for adjusting the pressure transmitted by it. While the tobacco 13 is passing beneath the tongue 17, the edges of the paper 10 are allowed to escape from the lateral guides 16 previously described, and are brought to a vertical position by a pair of rollers 19 (Fig. 20) which are mounted on vertical axes 20 fixed to the sides of the trough and are caused to rotate by contact with the edges of the endless band 3, to which the lower ends of the rollers 19 serve as guides, the rollers acting thus upon the band by their own weight or otherwise. On leaving the tongue 17, the upper surface of the tobacco core 13 retains its required form while the margins of the paper 10 pass beneath the appropriately shaped lower ends of a pair of vertical rollers 21, 22 mounted similarly to the roller 19, but one in rear of the other at opposite sides of the trough, with the result that the respective margins 23, 24 of the paper are successively bent toward one another and caused to overlap; the lower margin 23, which is first turned down (see Fig. 21) being brought into contact with the tobacco core 13 and the upper margin 24 thereafter turned down on to it (see Fig. 22). The stock (with the overlap 25 of the paper as yet unpasted) is then caused to pass beneath a short bridge 26 (Fig. 23) which spans the trough 2 and serves to smooth the overlap. After passing under this bridge the upper margin 24 of the paper passes over the upper surface of a pasting disk 27 (Fig. 24) with which the paper is caused to contact by the light pressure exerted by another vertical roller 28 whose flanged lower end overlaps the disk 27. The latter, which may be constituted by a flange on the lower end of a vertical roller 29, is both lightly coated with paste of suitable consistency, and also at the same time caused to rotate so as to present a constantly renewed and freshly pasted portion of its surface to contact with the paper, by means of a cord 30 stretched over the roughened upper surface of the disk 27 and over guide rollers or pulleys 31, 32, 33 whereof the two latter work in a box 34 supplied with paste, the cord being actuated as hereafter described.

On leaving the pasting disk 27, the stock passes beneath a pressing device which may consist of a series of light edge-runners 35, 36, 37 mounted to revolve on horizontal axes carried by levers 38 pivoted to the closed top 39 of this portion of the trough 2, the said top 39 being apertured at intervals to give passage to the edge-runners which press down the pasted upper margin 24 of the paper upon the other margin 23 which it already overlaps, and (in conjunction with the edges of the trough) serve to retain these margins in mutual contact by light but firm pressure against the tobacco core until the paste has become sufficiently dried.

The trough 2 (which is of uniform shape from the roller 14 onward) is preferably of relatively deep section throughout its length so as to cause the finished stock to present an oval form in cross section as indicated, the major axis of the oval extending vertically and the pasted overlap 25 of the paper being situated at its upper edge. In order however to permit the cross-sectional form of the stock to be varied to suit different requirements, the trough is made in two separable portions, each extending throughout its entire length. Of these, the outer portion or casing $2^c$, as shown in Figs. 16 to 26, is permanently fixed between the cheek plates 1, 1 and serves as a support for the inner portion or channel 2, which latter constitutes the trough properly so called and fits a groove in the outer casing to which it may be fixed by screws or other convenient means. Any number of interchangeable channels 2 may be provided, and may be readily substituted one for another as required.

Figure 21:
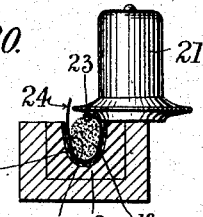
Figure 22:
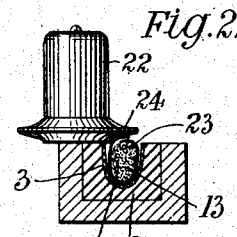
Figure 23:
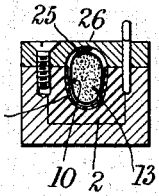
Figure 24:
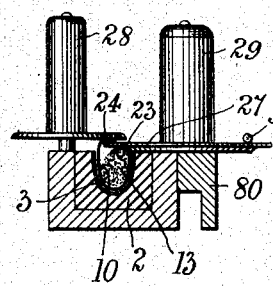
Figure 25:
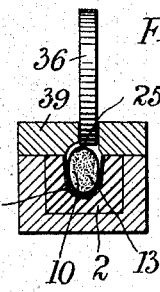
Figure 26:
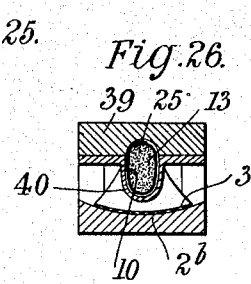

As the edges of the endless band 3 should stand just clear of the upper surfaces at the sides of the trough, it will be obvious that troughs of different cross-sectional shapes will as a rule require the use of bands of correspondingly different widths. As however the various roller-axes, bridge-pieces, and other mechanical details are all mounted upon the outer portion $2^c$ of the trough, these same parts will serve for use with all the interchangeable channels. Moreover, it is to be observed that the lower ends of all the vertical rollers 21, 22 and 27 (as shown in Figs. 21, 22 and 24) are, while the lower end also of roller 28 may be, so formed as to bear upon and guide the corresponding edges of the band 3, in the same way as do the lower ends of the rollers 19 as already mentioned.

Beyond the pressing device the trough terminates, its bottom being sloped downward as at $2^b$ (Fig. $2^c$) so as to permit the endless band 3 to pass downward out of contact with the stock and become lapped around the guide pulley 4, while however, the band 3 becomes deflected at the point $2^b$, the stock nevertheless continues to travel in a straight line, being received and supported by a tubular guide or sheath 40 (Figs. $2^c$ and 26) having a cross-sectional form adapted to fit easily around the stock. This guide-sheath is interrupted to give passage to the knife whereby successive cigarettes are severed from the continuous length of stock as hereafter described, but is continued beyond the knife as at $40^a$ so as to support the cigarette during the cutting operation.

The stock is fed forward intermittently as already mentioned, a length (equal to the predetermined length of the cigarettes to be produced) being caused at each forward reciprocation of the driving mechanism to protrude from a bed cutter (hereafter described) adapted to coact with a laterally reciprocating knife 41 (Figs. $3^c$ and 6) in severing the length thus projected. The knife, which performs its cutting stroke while the stock is stationary, is mounted to slide lengthwise transversely of the path of the stock, and is of dagger or V-shape as shown in Fig. 6, its acute-angled point first piercing the stock in the middle of the broadside depth thereof and thence cutting upward and downward simultaneously by means of the two sharp edges of the blade so as to produce a clean cut. The knife blade 41 is mounted in a holder 42 fitted to slide upon a guide 43 in contact with whose flat forward face it is retained by the pressure of adjustable springs as indicated at 44, the knife-guide extending as at $43^a$ through the gap between the two sections 40 and 40ª of the tubular guide-sheath already described so as to afford a continuous bearing for the rear face of the knife blade, and being apertured as at 43ᵇ (Fig. 6) to give passage to the stock, so that the flat forward face of the guide around this aperture constitutes a bed-cutter adapted to coact with the knife 41 in severing the cigarette. The knife holder 42 may be reciprocated by means of a crank 45 engaging in a transverse slot 46 in the holder, the crank being operated through the medium of free-wheel or ratchet mechanism adapted to transmit motion only during the return stroke of the treadle or other reciprocating part of the driving gear.

According to the preferred arrangement the spindle 47 which carries the crank 45 is mounted to rotate in fixed bearings 48 and has fast upon it a ratchet wheel 49 having only a single tooth or peripheral notch 50. Between the bearings, the spindle 47 passes loosely through a sleeve 51 which is integral with (or has fast upon it) a toothed wheel 52 and a hollow barrel 53, the latter serving to inclose the ratchet wheel 49 and to carry a spring-pressed pawl 54 which is adapted to engage the tooth 50, so that rotation will be communicated to the spindle 47 and crank 45 from the toothed wheel 52 when the latter revolves in one direction, but only if the pawl 54 happens to be in engagement with the tooth 50 (see Fig. 7). The wheel 52 gears with, and is driven in opposite directions alternately by, a rack 55 which is reciprocated lengthwise by means of the treadle mechanism, the diameter of the wheel 52 relatively to the length of stroke of the rack 55, and the angular position of the crank 45 relatively to the limits of the stroke of the rack, being such that, whatever the actual travel of the rack, the crank will during each return stroke thereof perform one complete revolution (always in the same direction) from its normal or resting position. Hence, as the crank normally stands (as shown) parallel to the direction of movement of the knife holder 42, the latter will during each return stroke of the rack 55 be moved forth and back so as to cause the knife 41 to first perform its cutting stroke and thereafter return to normal position wherein it offers no obstacle to the passage of the cigarette stock. At the same time however, owing to the ratchet-wheel 49 having only a single tooth, such movement of the knife holder and operation of the knife can take place only if the treadle has been operated to an extent sufficient to cause the pawl 54 to rotate through rather more than one complete revolution, which movement is made to correspond to the minimum length of cigarette to be produced, so that any accidental incomplete actuation of the treadle will not result in a length of stock being severed. The full movement of the treadle is made to correspond to the maximum length of cigarette to be produced, and the actual stroke of the treadle is regulated to correspond to any desired length of stock fed forward between two consecutive operations of the knife, by correspondingly varying the termination of the forward stroke of the rack 55 between the maximum and minimum points above indicated. This may be effected by adjusting a screw collar 56 (Fig. 3ᶜ) on the rack rod 57 so as to cause it to encounter at an earlier or later point in its forward travel a stop constituted by the bearing 58 through which said rod is fitted to slide, the rack however always returning to an invariable position on the termination of its backward stroke.

The reciprocations of the rack are produced by means of the treadle through the medium of mechanism which also serves to communicate the intermittent traveling movement to the endless band 3 whereby the stock is fed forward. For this purpose the forward end of the rack 55 is coupled by a link 59 to one end of a lever 60 (Fig. 2ᶜ) fulcrumed loosely on the axis 61 of that pulley 4 over which the band 3 (after the severance and delivery of the cigarette) is doubled back beneath the trough 2. This pulley 4, which may be termed the band-driving pulley, is of such diameter as to rotate only about (say) 90 degrees during each forward movement of the band, the latter being drawn forward by being gripped against the periphery of the pulley during each corresponding oscillation of the lever 60. For this purpose the lever has pivoted to it, at the end opposite to the link 59, a bell-crank 62 whereof one arm constitutes or carries a gripping pawl 63 adapted to nip the band 3 against the pulley 4 at a point clear of the cigarette stock, while the other arm is coupled by a link 64 to a radius-arm 65 pivotally attached as at 66 to the frame of the machine so as to constantly remain substantially parallel to the lever 60. The pivotal joint 67 between the radius-arm 65 and link 64 is coupled by a pitman 68 to the treadle 69, which preferably works in a plane parallel to the pulley 4. After the depression of the treadle, the various parts are returned to normal position preferably by means of a spring arranged as indicated at 70 so as to normally hold the pawl 63 clear of the band on the periphery of the pulley.

It will be observed that on the depression of the treadle 69, the pull transmitted through the link 64 has first for effect to cant the bell-crank 62 forward relatively to the lever 60 so as to cause the pawl 63 to positively grip the band 3 against the pulley 4 whereupon, further canting of the bell-crank being prevented, the lever 60 is set in motion in the direction of the arrow 4ª and carries around with it (until all the parts are arrested by the collar 56 encountering the stop 58)

the pulley 4, drawing the band 3 through the trough 2 to an equal extent, and causing the rack 55 to perform its forward movement. On the release of the treadle, the action of the spring 70 thrusts the link 64 in the opposite direction with the result that the bell-crank 62 is first canted backward relatively to the lever 60 so as to disengage the pawl 63 from the band 3 and pulley 4, whereupon the lever 60 is itself also moved back to normal position, leaving however the pulley 4 and band 3 in the position to which they had already been brought. At the same time this backward movement of the lever 60 is transmitted to the rack 55 which, in performing its reverse stroke, sets in motion the knife 41 so as to sever the length of stock which had been fed forward by the advance of the band 3.

Preferably some reciprocating member of the driving gear (such as the lever 60 for example) would be provided with ratchet and pawl or equivalent mechanism adapted, when a depressing movement of the treadle has once commenced, to prevent return of the treadle and other reciprocating parts to normal position until the full stroke has been completed, the object of this arrangement (which is of a well-known character and not illustrated in the drawings) being to prevent the accidental or malicious feeding forward (as the cumulative result of several incomplete treadle strokes prior to a full stroke whereby severance of the cigarette is effected) of a length of stock in excess of the predetermined length of the cigarette in course of production.

In order to prevent the crank 45 overshooting its normal or resting position (shown on the drawings) when the knife has completed its return stroke and the crank has performed one complete revolution, the knife holder 42 is made sufficiently heavy to insure its momentum being then so high as to prevent continued rotation of the crank spindle.

The cord 30 whereby the pasting disk 27 is both coated with paste and also frictionally driven, works in a direction parallel to the band 3 (see Fig. 3$^b$) and that guide pulley 31 over which the cord passes outside of the box 34, is fast on the same spindle 71 with a pulley 72 which in turn is driven by an endless indiarubber band 73 from a similar pulley 74 fast on the axis 75 of the guide pulley 7 which is mounted beneath the trough 2 and over which the band 3 is led, so that as this band is fed forward step by step the pasting cord 30 will likewise be continually drawn through the paste-box 34 and will thus maintain a fresh coating of paste on the disk 27. The pulleys 6 and 8 (Fig. 4) are placed at opposite sides of the pulley 7 so as to insure sufficient frictional contact between the band 2 and pulley 7 to cause this pulley to rotate at each forward movement of the band 3. The cord 30 is arranged to pass out through an opening in the rear wall 76 of the box 34 containing the adhesive material, the latter being so thick as to obviate risk of its leaking past the cord. The cord is led from the upper side of its driving pulley 31 over a grooved guide roller 32 (Fig. 8) removably mounted to rotate in notches 32$^a$ forming bearings on the upper edges of the box 34, and thence downward through the mass of paste 77 in the box to near the bottom of the latter, where the cord passes around the plain guide roller 33 and finally issues through that wall 76 of the box which is nearest the pasting disk 27. The roller 33 is in the form of a pin adapted to turn in bearing-holes 33$^a$, 33$^b$ (Fig. 10) in the lateral walls of the box 34 and capable of being withdrawn lengthwise through one of said holes, a movable cover plate 78 pivoted to the box serving to normally retain the roller in its bearings. That wall 76 (Fig. 11) of the box 34 through which the pasting cord 30 passes, is made removable by sliding vertically in guide-grooves 76$^a$ on the box, the lower edge of this wall being received in a groove 76$^b$ and being notched as at 79 to give passage to the cord while the portion of the notch left open beneath the cord is closed by a swinging gate 79$^a$ pivoted to the box as shown. The box 34 is clamped by a set screw 34$^a$ (Fig. 2$^b$) in a seat provided on a bracket 80 which is removably held by screws as at 80$^a$ upon the side frame or cheek plate 1 of the machine, this bracket serving also to carry the bearing for the pulley 72, so that the entire arrangement is adapted to enable the pasting device to be readily removed as a whole and to be taken to pieces with ease for the purpose of being cleansed and re-installed in position.

The tension of the endless band 3 may be adjusted and maintained by any convenient means. Preferably (as shown in Figs. 2$^a$ and 3$^a$) that guide pulley 9 over which the band returns from beneath the trough 2 to the point at which it receives the paper and tobacco constituting the stock, is mounted to turn upon a spindle 81 supported by a carriage 82 fitted to slide in guides 83 in the side frames 1 of the machine, the carriage 82 having attached to it a tension-rod 84 which, extending rearward, passes through a hole in a bridge piece 85 spanning the rear end of the frame. The outer end of the rod 84 is screw-threaded and carries a nut 86 which bears against the outer face of the bridge-piece 85, so that by turning the nut in one or the other direction the position of the pulley 9 and consequently the tension of the band 3 may be varied as required.

Means may be provided whereby the paper strip 10, as it passes from the roll 11 to the tobacco-feeding portion 12 of the trough 2, is printed on its outer face with any desired name or inscription at intervals corresponding to the lengths of successive cigarettes.

For this purpose the following arrangement (Figs. 2ᵃ and 3ᵃ) is preferably adopted. The paper strip 10, on leaving the roll 11, is led over the periphery of a pulley 87 mounted to turn freely on a stationary axis 88, the frictional contact of the paper with the pulley serving to rotate the latter at each forward movement of the stock through the machine. The pulley 87 serves as a printing platen, the impression being produced by an indiarubber or other rotary stamp 89 of circular segmental form fast on a rotary spindle 90 mounted to rotate on pivot-bearings (adjustable as at 90ᵃ) parallel to the axis 88 and at such a distance therefrom as to insure the requisite pressure being exerted between stamp and paper. The face of the stamp must obviously have the same peripheral velocity as the pulley 87 and the paper stretched over the latter, and must also be freshly inked after each impression, while successive impressions should occupy the same position relatively to one end of the respective cigarettes, notwithstanding any such relatively small variation between the lengths of successive parcels of cigarettes as may be produced by adjusting the position of the collar 56 relatively to the stop 58, as before described. For these purposes means are provided whereby each step by step forward movement of the paper strip is caused to bring about one printing operation, the distance between the points at which printing of the paper and severance of the stock respectively occur being once for all determined.

The spindle 90 of the rotary segmental stamp 89 is weighted eccentrically so as to constantly tend to assume an angular position wherein the stamp is in readiness to commence the printing operation, and this spindle has fast on it a friction wheel 91 having a mutilated rubber-covered periphery whose effective portion is adapted to contact with and receive rotary motion from the periphery of the pulley 87 alongside and clear of the paper strip. This effective portion of the wheel 91 has an angular position and circumferential length such that first, when the stamp 89 is in normal or resting position (i. e. ready to commence printing), the friction wheel 91 is just commencing to engage the pulley 87; that secondly, when the printing operation is completed, the continued rotation of the wheel 91 will carry the stamp face around in contact with a cylindrical freely revoluble inking pad 92; and that thirdly, after the inking of the stamp has thus been effected, the stamp 89 and friction wheel 91 will be left free to return, by rotation in the same direction under gravity alone, to the normal position above mentioned, such period of free rotation being of sufficient extent to provide the small interval of time required to allow for any difference between the lengths of different parcels of cigarettes. The axis of the inking pad 92 is mounted in a bracket 92ᵃ which is movable (by angular adjustment about a parallel axis 92ᵇ) for the purpose of regulating the pressure between the pad and the stamp 89 when these are in mutual contact.

The paper roll 11 is coiled as usual upon a drum 93 (Fig. 2ᵃ) supported upon an axial spindle 94 removably mounted in bearings constituted by notches in uprights 1ᵇ integral with the frame 1 of the machine, the rotation of the drum upon the spindle (under the pull transmitted through the paper strip 10) being resisted by a brake consisting of a pair of spring arms 95 fast on the spindle and bearing frictionally against the end face of the drum 93 as indicated. The spindle 94 is free to rotate through only a small angle under the effort transmitted by the brake this angle being determined by a cord 96 or the like attached to a fixed point as at 97 and to a weighted arm 98 fast on the spindle in such angular position that, during those recurring intervals when the forward motion of the paper strip is arrested as already described, the weight of the arm 98, by tending to produce reverse rotation of the roll 11, will hold the paper strip gently but firmly stretched over the platen-pulley 87 in readiness for the next printing operation.

It is to be observed that all parts of the machine are open to ready inspection and are capable of being easily removed and replaced by the attendant, so that no difficulty will be experienced in keeping the apparatus clean or in renewing any small portion of the mechanism which may become accidentally broken. Thus for example, the lateral guides 16 for the margins of the paper strip are detachably secured to the sides of the trough 2 by means of screws as at 16ᵃ, while all the bridge-pieces are readily detachable, the bridge-pieces 17ᵃ and 18ᵃ (whereof the former serves to carry the bearings 14ᵃ for the roller 14, as well as the tongue 17) being removably clamped upon the trough by pairs of set-screws as at 17ᵇ and 18ᵇ respectively. Further, the several vertical rollers 19, 21, 22, 27 and 28, which preferably act by their own weight solely, are all capable of being instantly slipped off or on to (as may be required) the fixed pins which constitute their respective axes. Again, the cover 39 of the closed portion of the trough 2 is preferably hinged to the back of the trough, and carries both portions of the guide 40, 40ᵃ, so that these, together with the edge-runners 35, 36 and 37, can all be instantly removed, or replaced accurately in position by a single movement. When in operative position the cover is held closed by means of a set screw or screws as indicated at 39ᵃ.

Instead of a series of edge-runners such as those at 35, 36 and 37 for pressing the pasted outer margin of the paper down upon the inner margin, a single edge-runner alone may be employed. Or a single presser may be substituted consisting of a cross-pin 99 carried by a pair of radius-links 100 pivoted at 101 to the cover 39 and free to rise and fall so that the pin 99 may rest by gravity upon the upper surface of the stock just before the latter passes beneath the cover, as indicated in Figs. 14 and 15. The severed cigarettes on leaving the guide 40ª may pass through an inclined trough 102 adapted to deliver them to any desired receptacle.

I claim—

1. A cigarette making machine, comprising a trough having an open feeding end, an endless band passing through the trough and entering at the feeding end, and in frictional contact at said feeding end with a strip of paper on to which the tobacco is laid, means for closing the strip of paper around the tobacco, means for advancing the endless band intermittently so as to carry by frictional contact both the paper and the tobacco step by step away from the feeding end through said means for closing the strip of paper around the tobacco and a reciprocating cutter actuated during the intervals of the successive forward movements of the endless band.

2. A cigarette making machine comprising a trough, an endless band passing through the trough and entering at the feeding end thereof, and engaging in frictional contact with a strip of paper to carry it through the trough, means for advancing the endless band intermittently so as to carry forward by frictional contact both the paper and the tobacco step by step away from the feeding end, and a longitudinal reciprocating dagger knife having a V-shaped double edge blade adapted to first pierce the stock in the center of its width and to then cut outwardly through the stock in opposite directions simultaneously.

3. A cigarette making machine comprising a trough having a cross sectional configuration corresponding to that of the cigarettes to be produced, an endless band passing through and receiving a cross sectional conformation from the trough, the rear or entering portion of the trough being open at the top so as to permit of the tobacco being fed by hand on to a continuous strip of paper laid upon the endless band therein, means for communicating to the endless band a succession of longitudinal movements each equal in extent to the length of an individual cigarette; means for shaping the upper surface of the tobacco deposited on the paper strip to the cross sectional form required; means for closing the edges of the paper together upon the tobacco core thus formed and for pasting said edges together, and a reciprocating dagger-knife actuated during the interval between the successive movements of advance transmitted by the endless band to the stock for severing from the latter the individual length to form cigarettes.

4. A cigarette making machine comprising a trough, an endless band passing through the trough and in frictional contact with a strip of paper on to which tobacco is laid, means for advancing the endless band intermittently so as to cause it to carry forward both the paper and the tobacco, and a device for shaping the upper surface of the tobacco core to the cross sectional form required consisting of a grooved roller adapted to bear upon the upper surface of the tobacco, and a longitudinally extending adjustable spring tongue situated behind the roller over a somewhat narrower portion of the trough.

5. In a cigarette making machine the provision of a trough, an endless band passing through the feeding end of the trough, means for advancing the endless band intermittently so as to cause it to carry forward away from the feeding end the paper and the tobacco step by step; means for turning the margin of the paper strip down on to the tobacco; means for pasting the overlying margin of the continuous paper strip preparatory to the latter being finally closed about the core of the tobacco, means for pressing the pasted overlap of the paper, consisting of a roller adapted to bear by gravity upon the stock at the point in its girth where the overlap occurs and a reciprocating dagger knife actuated during the intervals between the successive forward movements of the endless band.

6. In a cigarette making machine provided with means for closing a continuous strip of paper around the tobacco laid upon the said strip, a trough, an endless band in the trough, a portion of the trough being open at the feeding end, means for communicating to the said band a succession of longitudinal movements each equal in extent to the length of an individual cigarette comprising a pulley around whose periphery the endless band passes, a lever pivoted to oscillate about the axis of a pulley; a pawl pivoted to the lever and adapted when moved in one direction to grip the band against the periphery of the pulley, and means for transmitting motion to said lever and in opposition to spring pressure, to an extent corresponding to the length of an individual cigarette.

7. In a cigarette making machine the combination with the dagger-knife and the band driving means, of mechanism for actuating said knife comprising a slotted holder for the knife; a crank engaging in the slot of the said holder and carried by a rotary spindle, an oscillatory lever from which the intermittent movement of the endless band is derived, a rack coupled to and participating in the to-and-fro movement of the oscillatory lever, and ratchet gearing interposed between the rack and the crank spindle the arrangement being such that during the movement of the oscillatory lever which produces the movement of advance of the endless band the knife will remain stationary and that during the return movement of said lever, while the endless band remains stationary, the knife will be caused to perform its cutting and return strokes.

8. In a cigarette making machine the combination with the dagger-knife and the band driving means of mechanism for actuating said knife comprising a slotted holder for the knife, a crank engaging in the slot of said holder and carried by a rotary spindle, an oscillating lever from which the intermittent movement of the endless band is derived, a rack coupled to and participating in the to-and-fro movement of the oscillatory lever, means for adjusting the stroke of the rack for varying the length of the cigarette to be produced and a ratchet gearing interposed between the rack and the said crank spindle, the arrangement being such that during said movement of the oscillatory lever which produces the movement of advance of the endless band the knife will remain stationary and that during the return movement of the said lever, while the endless band remains stationary, the knife will be caused to perform its cutting and return strokes.

9. In a cigarette making machine, the combination with a trough, of an endless band in the trough in frictional contact with a strip of paper on to which tobacco is laid and means for advancing the endless band intermittently so as to cause it to carry forward the paper and the tobacco, of means for maintaining the tension of the paper strip at the feed end of the machine during the intervals between the successive forward movements of said strip, consisting of a friction-brake adapted to oppose the forward rotation of the paper drum but free to turn with the latter through a limited arc, a weighted lever movable as one with said brake and means for limiting the forward rotation of the brake and lever, substantially as specified.

OTTO WARTMANN.

Witnesses:
    H. D. JAMESON,
    F. L. RAND.